(12) United States Patent
Greenlee et al.

(10) Patent No.: US 8,710,954 B2
(45) Date of Patent: Apr. 29, 2014

(54) METHOD AND APPARATUS FOR TRIGGERING EXPIRATION OF A DATA TAG DEVICE

(75) Inventors: Kenneth L. Greenlee, Raleigh, NC (US); Christian L. Hunt, Cary, NC (US); Anne I. Ryan, Durham, NC (US)

(73) Assignee: International Business Machines Corporation, Armonk, NY (US)

(*) Notice: Subject to any disclaimer, the term of this patent is extended or adjusted under 35 U.S.C. 154(b) by 1671 days.

(21) Appl. No.: 12/112,869

(22) Filed: Apr. 30, 2008

(65) Prior Publication Data

US 2009/0276790 A1 Nov. 5, 2009

(51) Int. Cl.
*H04B 1/38* (2006.01)

(52) U.S. Cl.
USPC .......................... 340/5.63; 340/10.5

(58) Field of Classification Search
USPC .............. 340/2.7, 3.1, 3.2, 3.3, 3.31, 3.32, 340/3.42–3.44, 3.7, 501, 502, 507, 508, 340/516, 517, 519, 526, 527, 532, 539.3, 340/539.31, 540, 572.3, 572.4, 4.35, 5.1, 340/5.31, 5.28, 5.63, 5.65, 5.74, 10.1, 10.5, 340/10.51
See application file for complete search history.

(56) References Cited

U.S. PATENT DOCUMENTS

| | | | |
|---|---|---|---|
| 5,573,611 A | 11/1996 | Koch et al. | |
| 5,960,085 A * | 9/1999 | de la Huerga | 340/5.61 |
| 6,025,780 A | 2/2000 | Bowers et al. | |
| 6,741,523 B1 | 5/2004 | Bommarito et al. | |
| 6,933,848 B1 * | 8/2005 | Stewart et al. | 340/10.1 |
| 7,161,476 B2 | 1/2007 | Hardman et al. | |
| 7,212,955 B2 | 5/2007 | Kirshenbau et al. | |
| 7,321,307 B1 | 1/2008 | Tow et al. | |
| 7,345,586 B2 | 3/2008 | Black et al. | |
| 7,375,635 B2 | 5/2008 | Kessler | |
| 7,411,503 B2 | 8/2008 | Stewart et al. | |
| 7,548,164 B2 | 6/2009 | Guez et al. | |
| 7,667,572 B2 | 2/2010 | Husak et al. | |
| 7,855,644 B2 | 12/2010 | Greenlee et al. | |
| 2005/0116826 A1 | 6/2005 | Wertsebrger | |
| 2005/0127157 A1 | 6/2005 | Stemmle et al. | |
| 2005/0131763 A1 * | 6/2005 | Junger | 340/5.9 |
| 2006/0186994 A1 * | 8/2006 | Lin et al. | 340/5.74 |
| 2006/0187046 A1 | 8/2006 | Kramer | |
| 2007/0018832 A1 | 1/2007 | Beigel et al. | |
| 2008/0059659 A1 * | 3/2008 | Moritani et al. | 710/8 |
| 2008/0084309 A1 | 4/2008 | Posamentier | |
| 2008/0094220 A1 * | 4/2008 | Foley et al. | 340/572.4 |
| 2008/0106385 A1 * | 5/2008 | Kelley et al. | 340/10.5 |
| 2008/0117050 A1 | 5/2008 | Wu et al. | |

(Continued)

OTHER PUBLICATIONS

Karjoth, G., et al., "Disabling RFID Tags with Visual Confirmation: Clipped Tags are Silenced", IBM Research Report, Aug. 2005.

(Continued)

*Primary Examiner* — Thomas Mullen
(74) *Attorney, Agent, or Firm* — Patents on Demand P.A.; Brian K. Buchheit; Scott M. Garrett

(57) ABSTRACT

The present invention discloses an active data tag device (100) which includes an expiration event generator (108), and a memory (106) which has tag data (116) stored therein. Upon the occurrence (614) of and expiration event, the tag disables access to the tag data.

20 Claims, 4 Drawing Sheets

(56) References Cited

U.S. PATENT DOCUMENTS

| | | | |
|---|---|---|---|
| 2008/0157974 A1* | 7/2008 | Boss et al. | 340/572.3 |
| 2008/0166138 A1* | 7/2008 | Hanano et al. | 399/12 |
| 2009/0040878 A1 | 2/2009 | Domes et al. | |
| 2009/0096588 A1* | 4/2009 | Mynhardt | 340/10.42 |
| 2009/0212781 A1 | 8/2009 | Bertness et al. | |
| 2009/0303017 A1 | 12/2009 | Greenlee et al. | |
| 2009/0303020 A1 | 12/2009 | Greenlee et al. | |
| 2009/0303049 A1 | 12/2009 | Greenlee et al. | |
| 2009/0303061 A1 | 12/2009 | Greenlee et al. | |

OTHER PUBLICATIONS

Campbell, A., "Clippable RFID Tags to Protect Consumers", RFID Weblog, Jan. 2006.
Schwartz, E., "IBM Clips RFID's Wings to Stop Private Data's Flight", Computerworld, Nov. 2006.
"Problems With RFID", Technovelgy, LLC, viewed Feb. 5, 2008.
US Pub. No. 20090303061, Notice of Allowance, Aug. 6, 2010.
US Pub. No. 20090303020, Non Final Office Action, Jun. 9, 2010.
US Pub. No. 20090303049, Non Final Office Action Jun. 8, 2010.

* cited by examiner

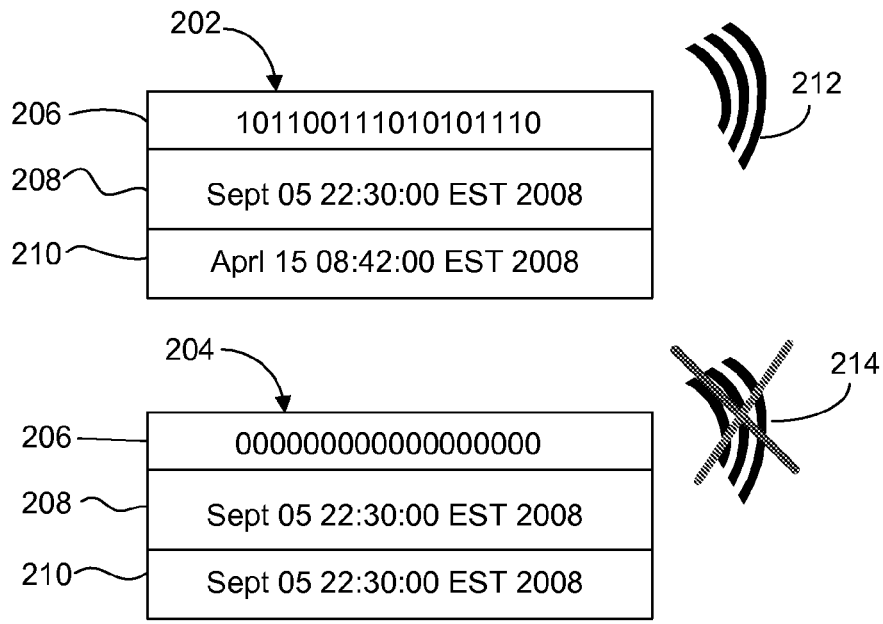
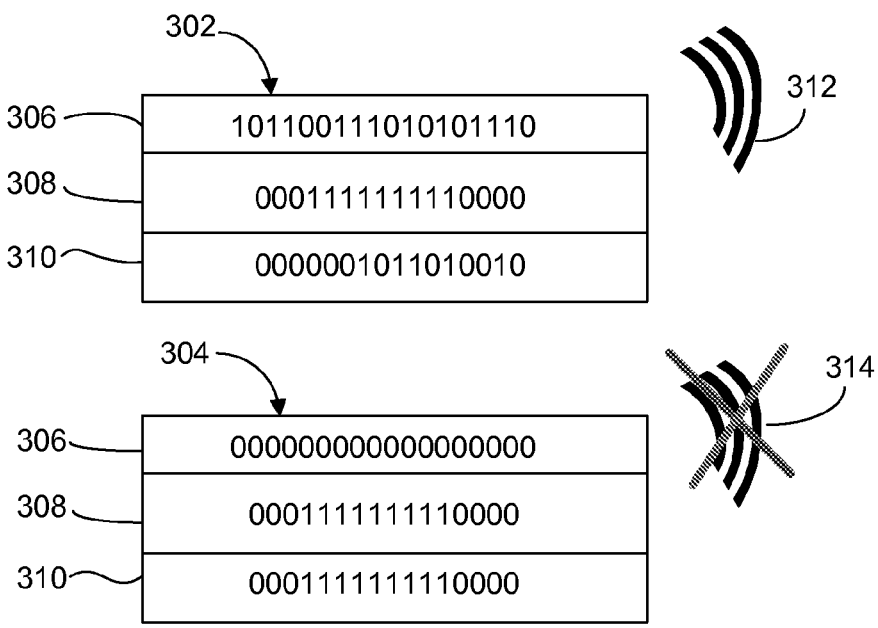

METHOD AND APPARATUS FOR TRIGGERING EXPIRATION OF A DATA TAG DEVICE

BACKGROUND OF THE INVENTION

The present invention relates to the field of data tag devices, and more particularly to active data tag devices which store time-sensitive data.

Data tag devices are in widespread use and are used to associate information with a particular item, object, or person. Typically the data stored in a tag device is read using a wireless radio frequency interface. A query is transmitted to the tag device, and the tag device responds by transmitting its stored data, which is read by a receiver or tag reader.

Tags are used in a variety of industries including retail, transportation, medical/healthcare, and security, to name several. They are configured, accordingly, in a variety of form factors, as dictated by the particular application. Tags can be manufactured at such a low cost that they can be considered disposable in many applications. However, once a given tag's purpose has been fulfilled, it will persist, storing its data in a retrievable format indefinitely. Even so called "active" tags, which incorporate a power source, may remain viable for years after being initially deployed because, unless it is receiving or transmitting, a tag uses virtually no power.

The persistence of tag data, and the pervasiveness of tag usage have given rise to privacy concerns. Tags are typically concealed in packing materials, containers, products, and even integrated into these items, often without consumer knowledge. When these items are disposed of, the information in the tags may be obtained by third parties. Information relating to purchases, medicine, identity, even finances could potentially be obtained. It is anticipated that tag usage will increase.

To ease concerns, some retailers will disable tags on items purchased at the point of sale. However, only those tags which can be disabled, and which are known can be deactivated. Deactivating tags at retail points of sale obviously can only affect tags used in retail practices, and not tags used in other industries. Disabling these tags also adds an additional process at the point of sale. Deactivating tags at a point of sale adds a cost in both equipment and time necessary to deactivate each tag. Deactivating a tag at a point of sale may also be undesirable for other reasons, such as warranty and return tracking, for example.

Another means for deactivating tags is for the consumer to use a so-called RFID zapper, which attempts to overload the circuits of the tag and destroy it as a result. A consumer may also simply destroy a tag to dispose of it. Of course, these methods assume the consumer both knows of the existence of the tag, and that the tag can reasonably be removed from the item with which it is associated.

Therefore there exists a need for a way to disable data tags without user or retail intervention to ensure the tag information will not be acquired by third parties.

BRIEF SUMMARY OF THE INVENTION

The invention provides in one embodiment a method for triggering a self-expiration process in an active data tag device. The process begins by initiating a clock in the active data tag device. The clock includes a clock value which changes with time. The method commences by comparing the clock value to an expiration value. While the clock value has not reached the expiration value, the active data tag device provides access to tag data stored in the active data tag device via an interface. Upon the clock value reaching the expiration value, the method commences by disabling access to at least a portion of the tag data. Disabling access to the data includes, among others, erasing the tag data, ceasing to respond to queries for the tag data, disabling interface circuitry, or disabling the memory element in which the tag data is stored, or any combination of these modalities.

Another embodiment the invention includes an active data tag device having a memory element for storing tag data, an interface element for facilitating communication of the tag data in response to a query received at the interface element, a clock element having a clock value which changes with time once the clock element is initiated, a control element for comparing the clock value to an expiration value, and disabling access to at least a portion of the tag data upon the clock value reaching the expiration value, and a battery element for providing power to at least the clock element and the control element.

The invention also provide in a further embodiment a method of operating a self-expiring active data tag device including the processes of detecting the occurrence of an internal expiration event, and disabling access to at least a portion of tag data stored in the self-expiring active data tag device.

In still a further embodiment, the invention includes a self-expiring active data tag device which has a machine readable storage medium containing tag data, a controller operably coupled to the machine readable storage medium, a radio interface circuit operably coupled to the controller, and an event generator coupled to the controller and configured to generate an expiration event. The controller in configured to disable access to at least a portion of the tag data in response to the expiration event.

BRIEF DESCRIPTION OF THE SEVERAL VIEWS OF THE DRAWINGS

FIG. 2 is a diagram of an active data tag before and after the occurrence of an expiration event, in accordance with an embodiment of the invention;

FIG. 3 is a diagram of an active data tag before and after the occurrence of an expiration event, in accordance with an embodiment of the invention;

DETAILED DESCRIPTION OF THE INVENTION

Figure 1:
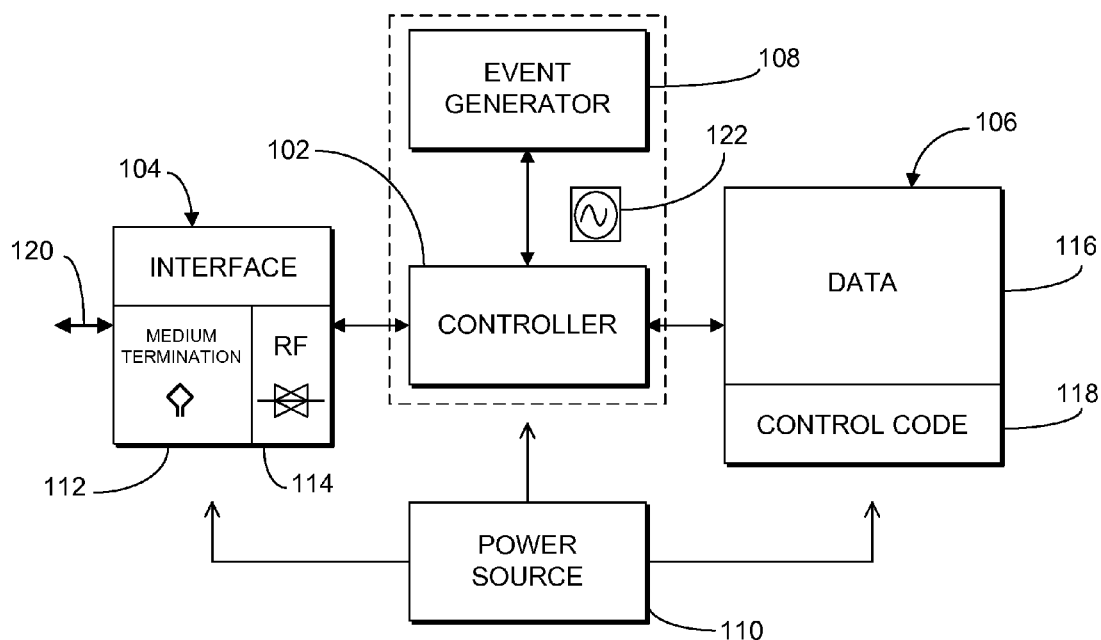
FIG. 1 is a block schematic diagram of an active data tag device in accordance with an embodiment of the invention.

The present invention discloses a solution for the problem of persistent data in data tags which may be read by unauthorized or undesired third parties by providing a self-expiration mechanism. More specifically, the invention includes an expiration mechanism which, after a period of time or upon occurrence of an expiration event recognized by the data tag, causes the data tag to disable access to tag data that had been stored in the data tag.

As will be appreciated by one skilled in the art, the present invention may be embodied as a method, system, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product on a computer-usable storage medium having computer-usable program code embodied in the medium. In a preferred embodiment, the invention is implemented at least in part in software, which includes but is not limited to firmware, resident software, microcode, etc.

Furthermore, the invention may be embodied as a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. Examples of a computer-readable medium include a semiconductor or solid state memory, magnetic tape, a removable computer diskette, a random access memory (RAM), a read-only memory (ROM), an erasable programmable read-only memory (EPROM or Flash memory, a rigid magnetic disk and an optical disk. Current examples of optical disks include compact disk—read only memory (CD-ROM), compact disk—read/write (CD-R/W) and DVD. Other computer-readable medium can include a transmission media, such as those supporting the Internet, an intranet, a personal area network (PAN), or a magnetic storage device. Transmission media can include an electrical connection having one or more wires, an optical fiber, an optical storage device, and a defined segment of the electromagnet spectrum through which digitally encoded content is wirelessly conveyed using a carrier wave.

Note that the computer-usable or computer-readable medium can even include paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

FIG. 1 is a block schematic diagram of an active data tag device 100 in accordance with an embodiment of the invention. The active data tag device is used to store tag data, and physically associate that tag data with some object, location, or other entity. To that end, the data tag is typically affixed to the object, or packaging containing the object. The tag is typically made to be disposable, and is permanently or semi-permanently mounted in association with the object, although a tag may be removably attached to an object for a temporary association as well. A data tag responds to a data query from a tag reader. Accordingly, the data tag requires a controller 102, an interface 104, and a memory element 106. Those skilled in the art will appreciate that the grouping of elements shown here, by function, does not necessarily represent how the elements would be grouped physically. The controller is a computing and logic component which executes instructions or programming designed to carry out the functions of the data tag, such as recognizing received queries and fetching data from the memory, for example. Typically, due to the low level of sophistication needed, the controller need not be on the order of a microprocessor, and dedicated logic which is responsive to a small number of events may be all that is needed.

The controller is coupled to an interface element 104 which provides a means of communicating with other devices. The interface element includes a medium termination 112, such as an antenna for wireless communication. Other terminators may be used, such as, for example, an electrical connector, although most tag devices operate wireles sly. A communication circuit 114 is coupled to the termination 112, and converts signals received via the termination to a form usable by the controller 102. Furthermore, the communication circuit receives data signals from the controller and converts them into a form for transmission over the media 120 via the termination 112. In one embodiment of the invention the communication circuit 114 is a radio frequency (RF) transceiver which converts received radio frequency signals into data signals, and vice-versa, as is known.

The controller is further coupled to a memory element 106, which contains at least a tag data section 116 for storing tag data. By "tag data" it is meant the information programmed or placed in the tag data section originating from an external source, and may include data generated by a sensor of the active data tag device. If the tag data is erased, the tag memory will contain data, in a strict sense, but it is not "tag data" for the purposes of the invention. The memory element is a machine readable storage medium. The memory element may also contain additional information, such as, for example control code 118. The control code may include instruction code for operating the controller, as well as operational parameters. Information which may be stored may include an initiation value, an expiration value, or both, to be used by the controller and event generator 108 in generating an expiration event.

The event generator may be part of the controller, as indicated by the dashed-line box around both the controller 102 and the event generator 108, or it may be a separate subsystem which is interfaced to the controller. The event generator is responsible for generating an expiration event at the end of the data tag's selected use time. That is, a usage period is selected for the tag, either at the time of manufacture, or as a result of programming thereafter, and the event generator produces an expiration event upon the passing of the usage period. The expiration event is recognized by the controller, and triggers a disabling process, resulting in the data tag becoming disabled, or expired. Once the data tag has expired, at least some of the tag data will not be available or accessible. The event generator may use an oscillator 122 or other clock source to measure or count time. The event generator may include, for example, a clock or counter.

To facilitate stable operation of the event generator, and operation of the other components, the data tag device further includes a power source 110, which may be, for example, an electrochemical cell or battery element. The power source also provides the power to the controller for the process of disabling the data tag upon the occurrence of the expiration event, among other controller activity. Furthermore, although grouped here by function, those skilled in the art will realize that in a physical implementation of the data tag the RF section 114, controller 102, event generator 108, and memory 106 will likely be implemented on a single semi-conductor chip.

FIG. 2 shows a diagram of an active data tag 200 before (202) and after (204) the occurrence of an expiration event, in accordance with an embodiment of the invention. The data tag has tag data stored in a tag memory 206. In the present embodiment, the data tag includes a clock value 210 from a running clock, and a pre-selected expiration value 208. The expiration value is used to determine an expiration time. The clock may maintain year, month, and day values as well as time of day. The before diagram 202 shows the expiration value as "Sep. 5 22:30:00 EST 2008," and the present time as "Apr. 15, 08:42:00 EST 2008." Therefore the time of the before example is before the expiration time. Accordingly, the tag will respond to queries by transmitting the tag data 212.

In the after diagram (204), however, the clock value 210 has reached the expiration value 208, and as a result, access to tag data will be disabled. In the present embodiment, when the clock value reaches the expiration value, access to the tag data is disabled by erasing the tag memory 206. Access to the memory is not necessarily disabled, and the tag may respond by transmitting the present memory contents, which having been erased, no longer contains the tag data.

The tag data may be erased by being overwritten with zeros, ones, or random data. Alternatively, it is contemplated that the memory containing the tag data may be disabled by the controller to prevent access to the tag data. The tag data that is erased may include all the tag data, or a specific portion of tag data. As a result, any queries received after the occurrence of the expiration event will result in the tag data not being transmitted 214. The tag may respond to queries after the expiration event by transmitting other data that has not been erased, or by transmitting the information in the overwritten memory location where the tag data was previously stored, or it may not respond at all. One advantage of using a time of day clock as in the present embodiment is that it may facilitate other timed operations, such as logging query events.

FIG. 3 shows a diagram of an active data tag 300 before (302) and after (304) the occurrence of an expiration event, in accordance with an alternative embodiment of the invention. The present embodiment, rather than using a time of day type clock, uses a counter 310, shown in the before diagram 302 at a random point in time after being initiated. The counter in the present example is an up counter, and counts up to a pre-selected expiration value 308. The counter will typically start from zero, but may be programmed with a different initial value to shorten the count time upon initiation of the tag. Alternatively, the expiration value may be selected for a desired count time. Upon the counter reaching the expiration value, at least a portion of the tag data in the tag memory 306 is erased, overwritten, or simply disabled. As a result, the tag can no longer respond with the tag data that was stored in the tag, as indicated by 314.

Figure 4:
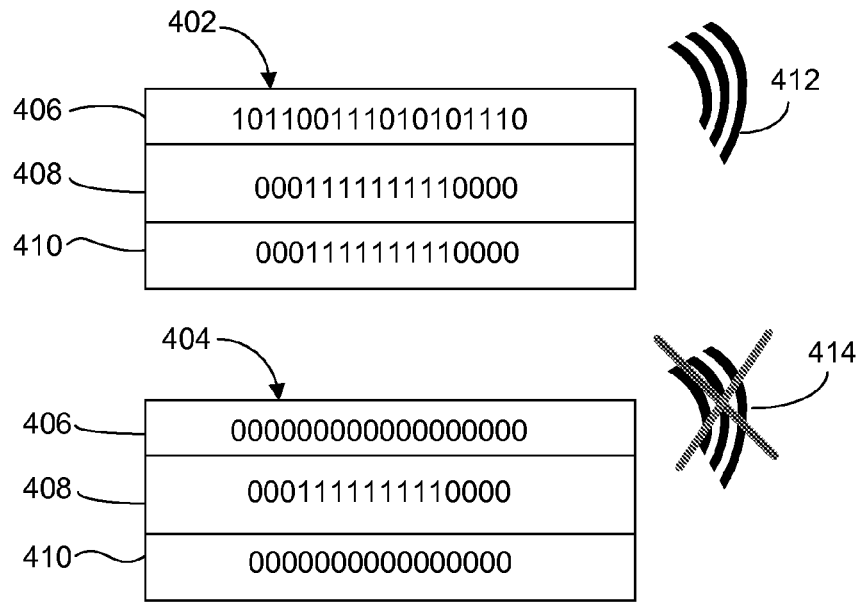
FIG. 4 is a diagram of an active data tag before and after the occurrence of an expiration event, in accordance with an embodiment of the invention.

FIG. 4 shows a diagram of an active data tag 400 before (402) and after (404) the occurrence of an expiration event, in accordance with an alternative embodiment of the invention. The tag data in the tag memory 406 of the present invention is erased upon expiration of a down counter 410 reaching an expiration value, such as zero, after starting from an initial value 408. Prior to the counter reaching the expiration value the tag will respond 412 with the tag data. Upon the expiration value being reached, and the tag memory 406 being erased or disabled, if the tag responds at all, the response will not include the tag data, as indicated by 414.

Figure 5:
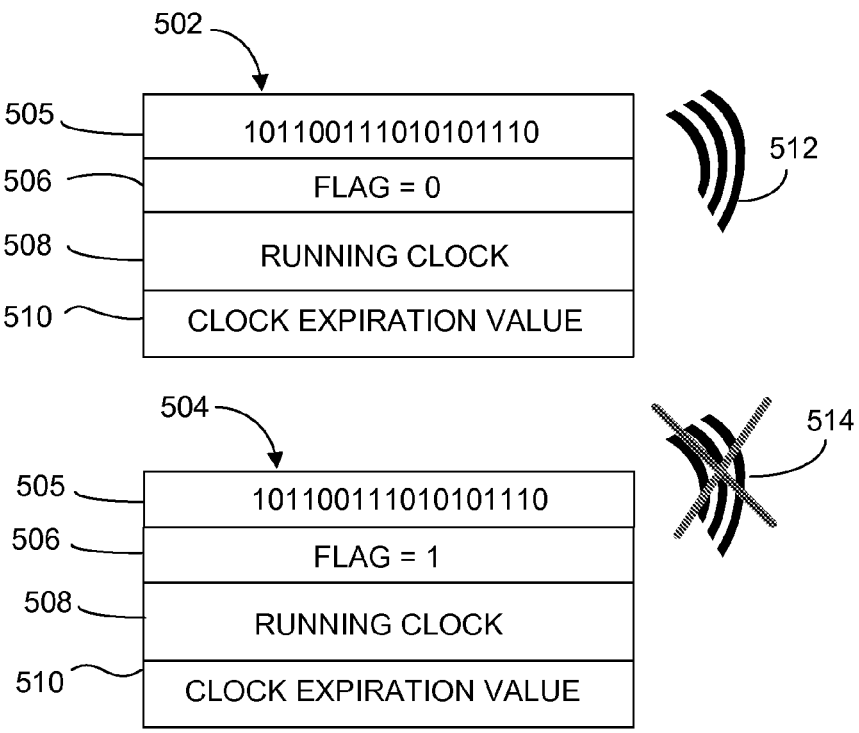
FIG. 5 is a diagram of an active data tag before and after the occurrence of an expiration event, in accordance with an embodiment of the invention.

FIG. 5 shows a diagram of an active data tag 500 before (502) and after (504) the occurrence of an expiration event, in accordance with an alternative embodiment of the invention. The present embodiment ceases responding to queries for the tag data in response to the occurrence of an expiration event. In the present example, the tag data stored in the tag memory 505 may persist after the expiration event occurs. However, as the tag ignores queries received subsequent to the expiration event, the tag data, while it persists in the tag memory, is not transmitted. Alternatively, the tag may cease responding with the entire tag data and may respond by transmitting only a portion of the tag data which is to remain accessible after the expiration event. A flag 506 may be maintained by the controller to determine tag validity. The flag may be kept at a valid state while a clock or counter 508 is running, and while the clock value has not reached an expiration value 510. While the flag is in the valid state (cleared) the controller will respond to any queries normally, and transmit the tag data in response 512. However, upon the expiration value being reached (504), or any other expiration event occurring at the event generator, the flag is set to an "invalid" state, and the tag will cease transmitting in response to queries, or at least will cease transmitting all of the tag data in response to any subsequent queries, as indicated by 514. The flag may be read by the controller directly, as a go/no-go condition, or, for example, the flag may be used to assert a signal to the transceiver which disables the transceiver, such as by switching off power to the transceiver.

The present embodiment of the invention may be used to preserve the tag data in the tag, but prevent it from being read by ordinary queries. However, if the flag 506 is used to prevent transmission of tag data, the tag may still receive query information. Special queries may be used, including authorization information, to re-enable the tag. For example, the tag may be provided with an identifier, which it transmits upon being queried, even if the response does not include tag data due to the tag being expired. The identifier may be associated with a secret key stored in the tag at the time of manufacture. To re-enable the tag, then, a first query would receive the tag identifier, but no tag data. A subsequent query may then be made, using the identifier and cross referencing manufacturer's information, transmitting the secret key to the tag. Upon receiving the secret key, and determining that the key matches the key stored in the tag, the tag may then respond with the tag data, reset the clock, allow reprogramming of the expiration values, and so on.

Figure 6:
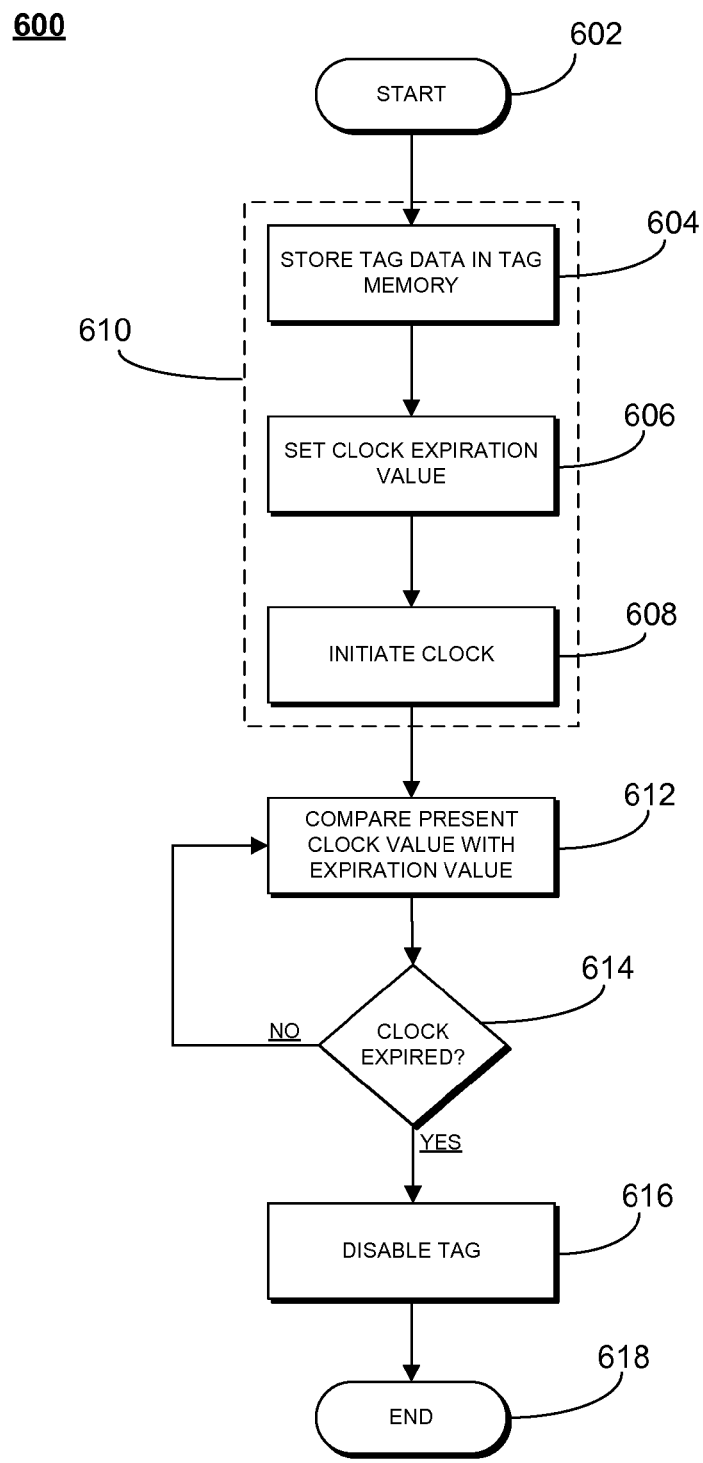
FIG. 6 is a flow chart diagram of a method of operating a self-expiring active data tag, in accordance with an embodiment of the invention.

FIG. 6 shows a flow chart diagram of a method 600 of operating a self-expiring active data tag, in accordance with an embodiment of the invention. At the start 602, the tag is ready for operation, but not yet programmed and operating. Therefore, the tag must be initiated. Initiating the tag may include storing tag data in the tag memory (604). Similarly, an expiration value must be set (606) along with any additional expiration parameters. When the tag is ready for use, the clock is started or otherwise initiated (608). The tag initiation process 610 includes steps 604, 606, and 608 which may be done at the same time, or at different times. For example, the event generator maybe initiated at the time of manufacture, or it may be initiated at the time of sale of an item with which the tag is associated. Similarly, tag data and the expiration value may be stored at differing times. Furthermore, while the tag data may be programmed into the tag memory, it is also contemplated that tag data may be generated or derived by the tag during use, such as by use of a sensor, as is known in active tag devices.

Once the tag is initialized, the tag then, among other processes it may perform, continues checking for an expiration event. For example, the tag may compare a present clock value with an expiration value (612, 614). The comparison may be a performed, for example, by the controller, or it may be performed by logic gates, or any other suitable means of comparing. While the clock value has not reached the expiration value, the process keeps repeating. Once the clock or counter value reaches the expiration value, access to the tag data will be disabled (616), and the method then terminates (618). The tag disables itself upon the occurrence of the expiration event. The disabling may be effected by one of several modalities, or a combination of modalities. For example, some or all of the tag data may be erased, or queries received after the expiration event may be ignored, or the tag may cease transmitting a selected portion of the tag data subsequent to the expiration event, or the interface circuitry may be rendered inoperable, and any combination of these exemplary modalities may be employed. The tag may be disabled by erasing or disabling the tag memory or a portion of the tag memory, or it may simply cease responding to subsequent queries. Furthermore, it is contemplated that multiple expiration events may be used to disable access to further portions of the tag data. For example, a first expiration event results in disabling access to a first portion of tag data, and a second, subsequent expiration event results in disabling access to a second portion of tag data. The second portion of tag data may be in addition to the first portion of tag data or it may be disabled alternatively to the first portion of tag data. The use of multiple or tiered expiration events, however, will still require generation of an expiration event and disabling access to at least a portion of the tag data.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method of triggering self-expiration of an active data tag device, comprising:

initiating a clock in the active data tag device, the clock having a clock value which changes with time;

comparing the clock value to an expiration value;

providing access to tag data stored in the active data tag device, via an interface, while the clock value has not reached the expiration value; and disabling access to at least a portion of the tag data when the clock value reaches the expiration value.

2. The method of claim 1, wherein initiating the clock comprises initiating a counter.

3. The method of claim 2, wherein initiating the counter comprises initiating a count down timer.

4. The method of claim 3, wherein the expiration value is zero.

5. The method of claim 1, wherein disabling access to at least a portion of the tag data comprises overwriting the portion of the tag data.

6. The method of claim 1, wherein disabling access to at least a portion of the tag data comprises at least one of disabling the interface or ignoring any query received after the clock value has reached the expiration value, or both.

7. The method of claim 1, wherein disabling access to at least a portion of the tag data comprises overwriting the portion of the tag data and disabling the interface.

8. The method of claim 1, wherein providing access to tag data comprises providing access via a wireless radio frequency interface.

9. An active data tag device, comprising:
a memory element for storing tag data;
an interface element for facilitating communication of the tag data in response to a query received at the interface element;
a clock element having a clock value, the clock value which changes with time once the clock element is initiated;
a control element for comparing the clock value to an expiration value, and disabling access to at least a portion of the tag data upon the clock value reaching the expiration value; and
a battery element for providing power to at least the clock element and the control element.

10. An active data tag device as defined in claim 9, wherein the interface element comprises a radio frequency wireless interface.

11. An active data tag device as defined in claim 9, wherein the clock element comprises a counter.

12. An active data tag device as defined in claim 11, wherein the counter is a down counter.

13. An active data tag device as defined in claim 9, wherein the clock element is an oscillator, wherein the control element detects an expiration event that triggers the active data tag to execute a disabling process, resulting in the data tag that was previously accessible becoming inaccessible.

14. An active data tag device as defined in claim 9, wherein the control element is configured to perform, upon the clock value reaching the expiration value, at least one of overwriting at least a portion the tag data, disabling the interface element, or ceasing to respond to queries.

15. A method of operating a self-expiring active data tag device, comprising:
detecting an occurrence of an expiration event, which is an event internal to the self-expiring active data tag device, wherein the expiration event is triggered by components of the self-expiring active tag device; and
disabling access to at least a portion of tag data stored in the self-expiring active data tag device.

16. A method of operating a self-expiring active data tag device as defined in claim 15, wherein disabling access is performed by overwriting the portion of tag data stored in the self-expiring data tag device.

17. A method of operating a self-expiring active data tag device as defined in claim 15, wherein disabling access is performed by ceasing to respond to queries, at least in part.

18. A method of operating a self-expiring active data tag device as defined in claim 15, wherein detecting the occurrence of an internal expiration event comprises detecting a counter reaching an expiration value.

19. A self-expiring active data tag device, comprising:
a non-transitory machine readable storage medium containing tag data;
a controller operably coupled to the machine readable storage medium;
a radio interface circuit operably coupled to the controller; and
an event generator coupled to the controller and configured to generate an expiration event;
wherein the controller is configured to disable access to at least a portion of the tag data in response to the expiration event.

20. A self-expiring active data tag device as defined in claim 19, wherein the event generator comprises a clock and the expiration event occurs when the clock reaches an expiration value.

* * * * *